United States Patent
Schifferl

(10) Patent No.: US 6,564,167 B2
(45) Date of Patent: May 13, 2003

(54) METHOD OF DETERMINING A POSITION IN DEPENDENCE ON A MEASUREMENT SIGNAL OF A POSITION SENSOR

(75) Inventor: Ludwig Schifferl, Pentling (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/781,174

(22) Filed: Feb. 12, 2001

(65) Prior Publication Data

US 2001/0020455 A1 Sep. 13, 2001

Related U.S. Application Data

(63) Continuation of application No. PCT/DE98/03781, filed on Dec. 23, 1998.

(30) Foreign Application Priority Data

Aug. 12, 1998 (DE) .......................... 198 36 388

(51) Int. Cl.$^7$ .............................................. F02M 39/00
(52) U.S. Cl. .................. 702/150; 702/33; 702/38; 702/50; 702/85; 702/100; 702/113
(58) Field of Search ............................... 702/33, 36, 38, 702/50, 55, 85, 89, 94, 99, 100, 104, 105, 108, 150, 113–116, 127, 130, 132, 136, 140, 151, 177, 178, 183, 184, 188, FOR 123–124, FOR 128, FOR 134, FOR 141, FOR 142, FOR 143, FOR 154–163, FOR 170, FOR 171; 324/207.2, 207.21, 207.25; 73/597, 598, 599, 602, 627, 629, 662, 663, 665

(56) References Cited

U.S. PATENT DOCUMENTS

| | | | | |
|---|---|---|---|---|
| 3,927,528 A | * | 12/1975 | van der Kolk et al. | 60/431 |
| 4,432,331 A | * | 2/1984 | Yasuhara | 123/571 |
| 4,580,541 A | * | 4/1986 | Koumura | 123/478 |
| 4,616,618 A | * | 10/1986 | Blöcher et al. | 123/478 |
| 4,730,264 A | | 3/1988 | Kohler | |
| 5,054,447 A | * | 10/1991 | Fukui et al. | 123/414 |
| 5,133,323 A | * | 7/1992 | Treusch | 123/494 |
| 5,136,880 A | * | 8/1992 | Norgauer | 73/117.3 |
| 5,161,505 A | * | 11/1992 | Bederna et al. | 123/399 |
| 5,255,653 A | * | 10/1993 | Ironside et al. | 123/399 |
| 5,320,076 A | * | 6/1994 | Reppich et al. | 123/399 |
| 5,323,747 A | * | 6/1994 | Büchl Josef | 123/399 |
| 5,327,865 A | * | 7/1994 | Riehemann | 123/397 |
| 5,521,825 A | * | 5/1996 | Unuvar et al. | 364/431.05 |
| 5,617,337 A | * | 4/1997 | Eidler et al. | 364/551.01 |
| 5,622,151 A | * | 4/1997 | Lang | 123/339.15 |
| 5,669,353 A | * | 9/1997 | Shirai et al. | 123/399 |

(List continued on next page.)

FOREIGN PATENT DOCUMENTS

| | | |
|---|---|---|
| EP | 0724067 A1 | 7/1996 |
| JP | 61234213 A | * 10/1986 |
| JP | 451829 A2 | * 10/1991 |
| WO | WO 92/02712 | * 2/1992 |

OTHER PUBLICATIONS

Published International Application No. 89/10540 (Spahr), dated Nov. 2, 1989.

Primary Examiner—Marc S. Hoff
Assistant Examiner—Carol S Tsai
(74) Attorney, Agent, or Firm—Laurence A. Greenberg; Werner H. Stemer; Ralph E. Locher

(57) ABSTRACT

The position sensor has a sensor element and a transmitter part which can be displaced between a first end position and a second end position. The measurement signal passes through an extreme value between the first and the second end positions. The actual values of the measurement signal in the first and second end position are determined. The extreme value of the measurement signal between the first and second end position is also determined. The position is determined in dependence on the current actual value of the measurement signal, the extreme value, and the actual values in the first and second end positions.

6 Claims, 5 Drawing Sheets

U.S. PATENT DOCUMENTS 5,689,067 A * 11/1997 Klein et al. ................. 73/118.1
5,738,053 A * 4/1998 Kato ....................... 123/90.15
5,764,066 A 6/1998 Novak et al. ............... 324/662
5,823,164 A * 10/1998 Seki et al. .................. 123/396
5,862,791 A * 1/1999 Schoenfelder et al. ...... 123/357
6,076,502 A * 6/2000 Katashiba et al. .......... 123/435
6,089,535 A * 7/2000 Mizutani et al. ....... 251/129.04
6,253,748 B1 * 7/2001 Engel et al. ............ 123/568.21

* cited by examiner

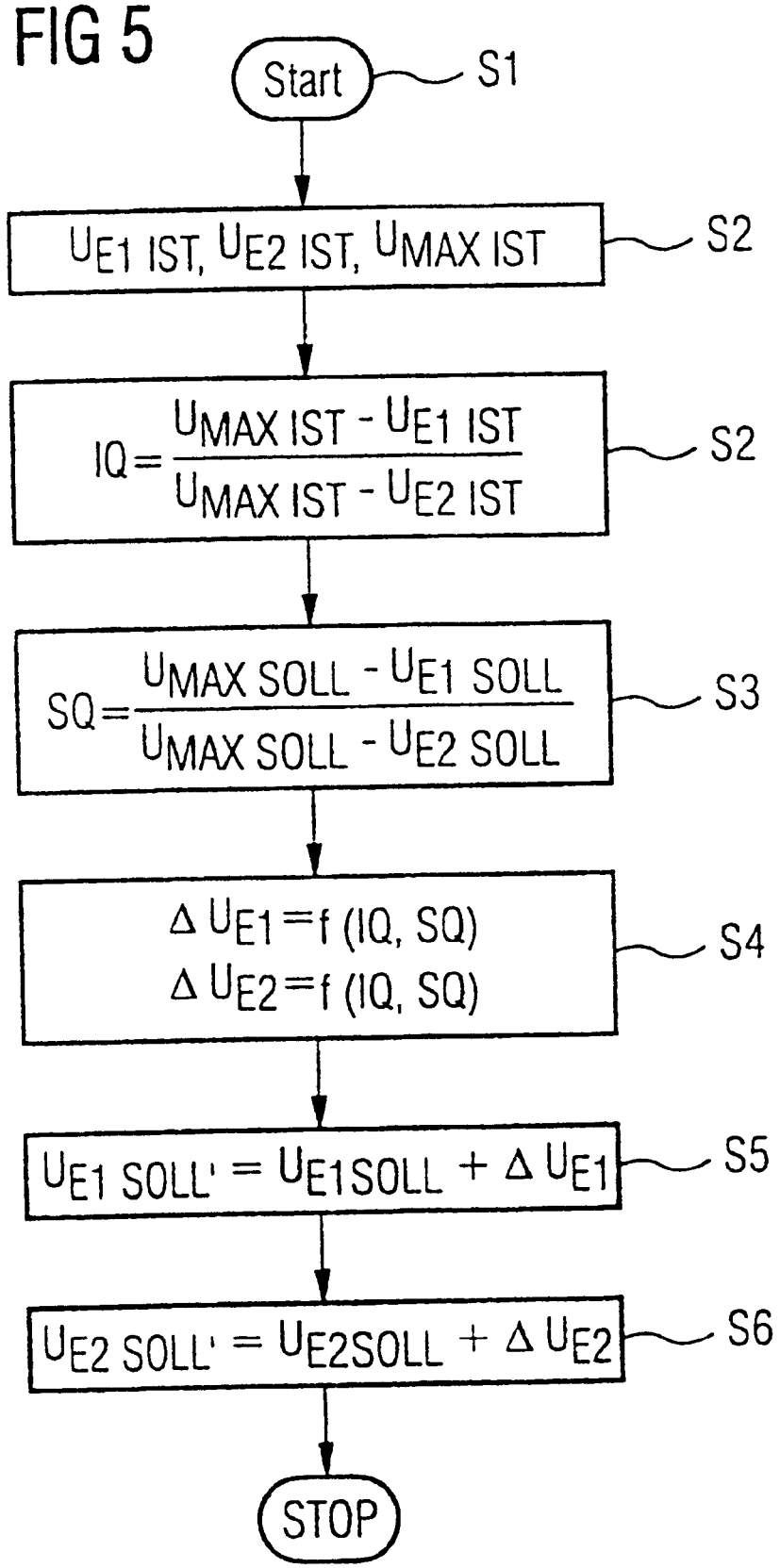

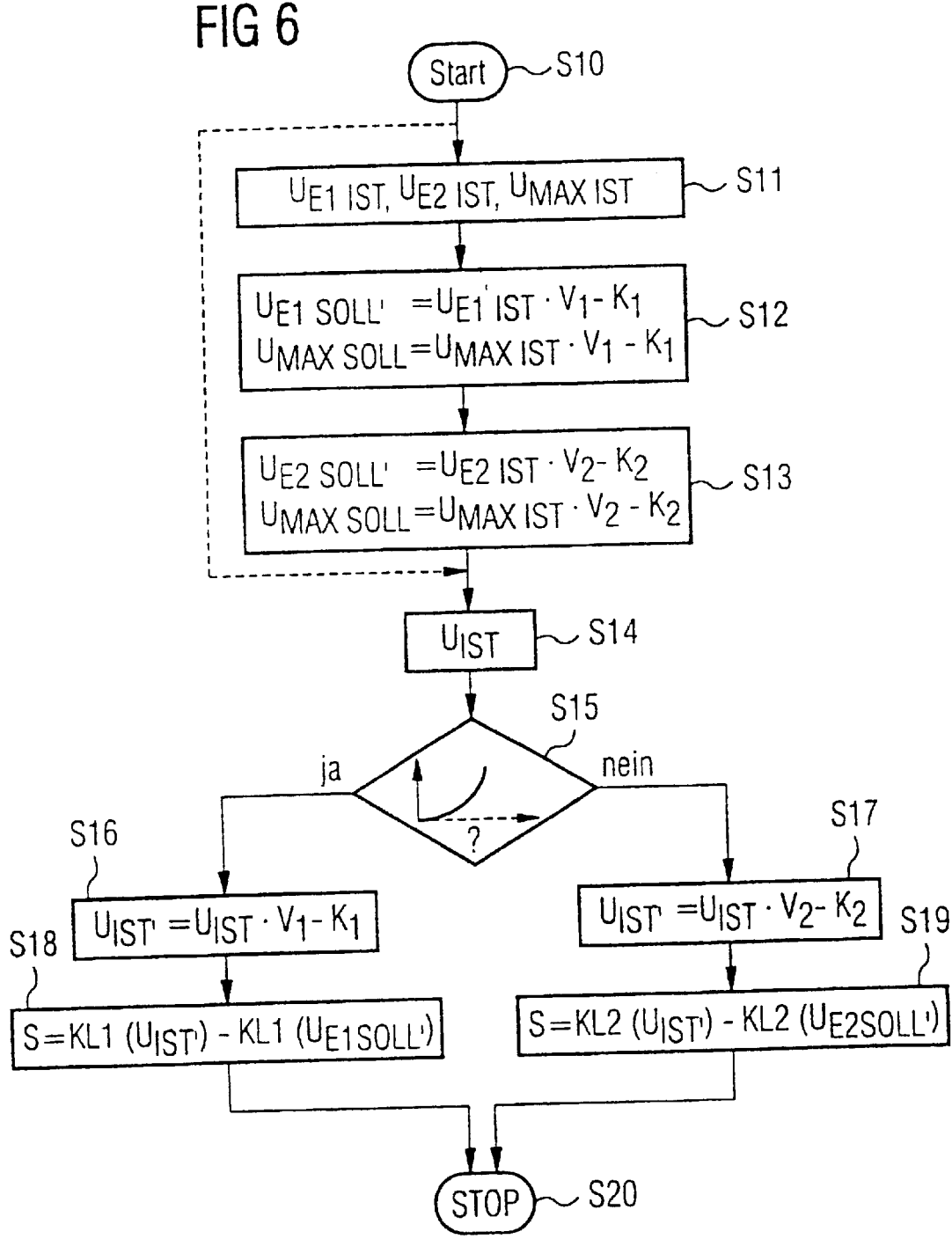

METHOD OF DETERMINING A POSITION IN DEPENDENCE ON A MEASUREMENT SIGNAL OF A POSITION SENSOR

CROSS-REFERENCE TO RELATED APPLICATION

This application is a continuation of copending International Application No. PCT/DE98/03781, filed Dec. 23, 1998, which designated the United States.

BACKGROUND OF THE INVENTION

Field of the Invention

The invention relates to a method for determining a position in accordance with the measurement signal of a position sensor, in particular for the use of the position sensor in the case of an electromechanical actuator for gas exchange valves of an internal combustion engine.

Accurate determination of the position of the gas exchange valve is the basis for low-noise and substantially wear-free operation of an electromechanical actuator, which is for example intended to control the movement of gas exchange valves of an internal combustion engine. Such electromechanical actuators are known, for example, from U.S. Pat. No. 5,752,478 (see Japanese application JP 31394/95 and European application EP 0 724 067 A1).

Position sensors, which comprise a magnetoresistive element and a permanent magnet which can be displaced in relation to the magnetoresistive element, are used to detect positions in the case, in particular, of electromechanical actuators. Magnetoresistive elements, in particular so-called Giant Magneto-Resistive (GMR) elements, produce a measurement signal which depends on the direction of the magnetic field acting on them. In the case of a linear movement of the permanent magnet to the magnetoresistive element, the measurement signal of the position sensor essentially has a cosinusoidal profile.

The relationship between the measurement signal of the position sensor and the associated position is determined by measurements on a reference position sensor, and then stored in the form of a characteristic map, e.g. as tables in control units which determine the position from the characteristic in accordance with the measurement signal of the series position sensor. Errors may thereby possibly occur in the determination of the position, firstly through inaccuracies in the arrangement of the permanent magnet on the object whose position is to be detected, with respect to the arrangement of the magnetoresistive element, secondly through inaccuracies in the arrangement of the sensor element, thirdly because of tolerances in the manufacture of the position sensors, and fourthly through the effect of perturbations such as the temperature of the sensor element.

SUMMARY OF THE INVENTION

It is accordingly an object of the invention to provide a method for determining a position in accordance with the measurement signal of a position sensor, which overcomes the above-mentioned disadvantages of the heretofore-known devices and methods of this general type and which ensures accurate and reliable determination of the position.

With the foregoing and other objects in view there is provided, in accordance with the invention, a method of determining a position in dependence on a measurement signal of a position sensor, the position sensor having a sensor element and a transmitter part displaceable between a first end position and a second end position, and the measurement signal having an extreme value between the first end position and the second end position. The method comprises the following method steps:

determining actual values of the measurement signal in a first end position and a second end position;

determining an extreme value of the measurement signal between the first end position and the second end position; and determining a position in dependence on a current actual value of the measurement signal, the extreme value and the actual values in the first end position and the second end position.

In accordance with an added feature of the invention, a parameter for an axial offset between the transmitter part and the sensor element is determined in dependence on the extreme value of the measurement signal and the actual values of the measurement signal in the first end position and in the second end position, and the position is determined in dependence on the parameter.

In accordance with an additional feature of the invention, the position sensor is disposed to detect the position of an electromechanical actuator, and the parameter is determined during a starting operation of the actuator.

In accordance with another feature of the invention, there are determined a gain value and an offset value in dependence on the parameter for the axial offset, the extreme value of the measurement signal and the actual values in the first end position and the second end position, and the respective current measurement signal is corrected in dependence on the gain value and the offset value.

In accordance with a further feature of the invention, the gain value and the offset value are determined when a predetermined period of time has elapsed during the operation of the position sensor, and/or a quantity characterizing a temperature of the position sensor has changed by a predetermined threshold value, and/or an error of the position in the end positions has been detected.

In accordance with again an added feature of the invention, the method encompasses determining the position, in dependence on the corrected current measurement signal, from a characteristic and the parameter for the axial offset.

In accordance with again another feature of the invention, the parameter for the axial offset is a corrected setpoint value of the measurement signal in the first end position or the second end position.

In accordance with a concomitant feature of the invention, the extreme value of the measurement signal is chosen as the maximum value.

Other features which are considered as characteristic for the invention are set forth in the appended claims.

Although the invention is illustrated and described herein as embodied in a method for determining a position with a measurement signal of a position sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is a first flow chart for the determination of a parameter for the axial offset; and FIG. 6 is a second flow chart for the determination of the position.

DESCRIPTION OF THE PREFERRED EMBODIMENTS

Figure 1:
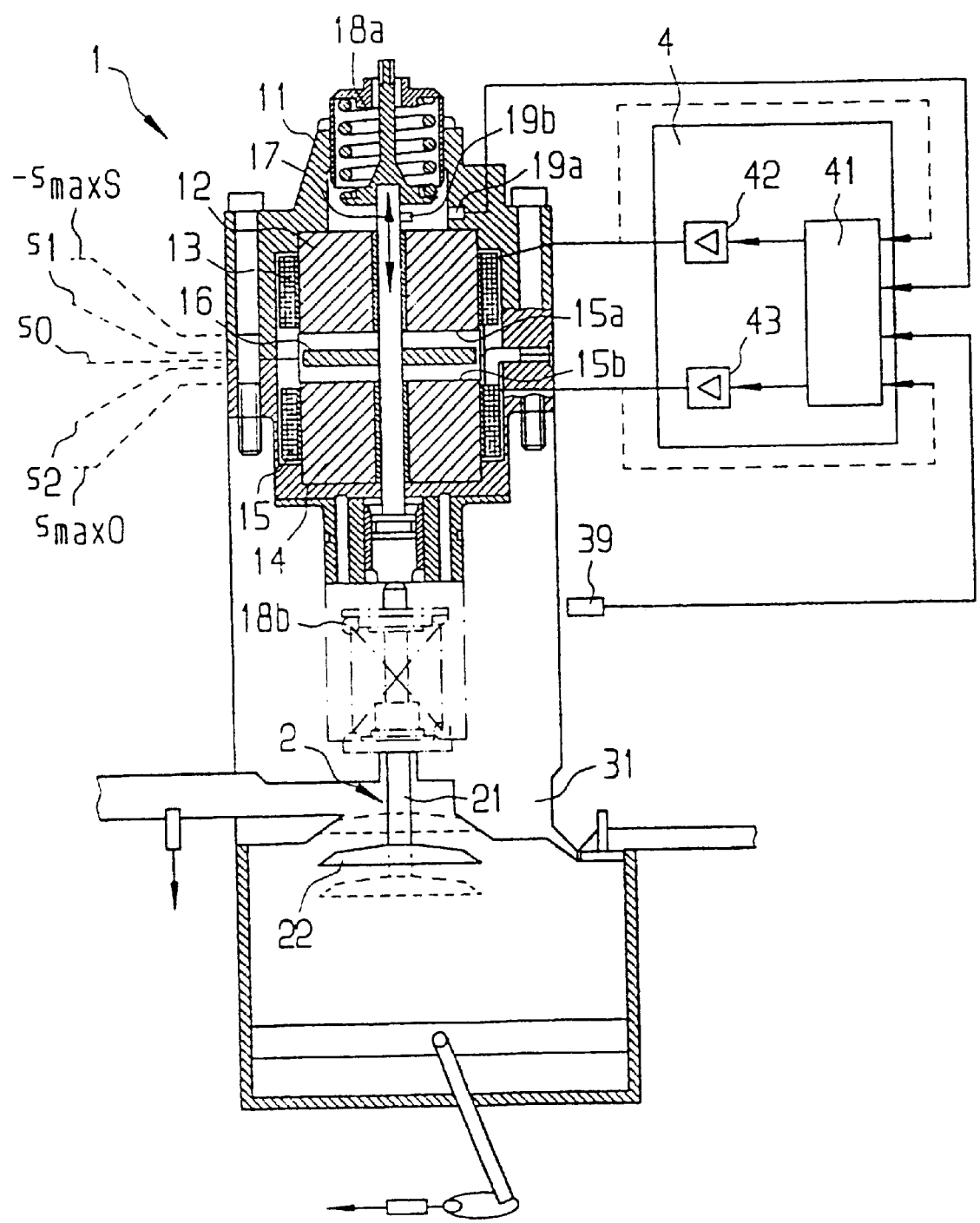
FIG. 1 is a partly schematic, partly longitudinal sectional view of a system with a position sensor in an actuator for a gas exchange valve of an internal combustion engine.

Referring now to the figures of the drawing in detail and first, particularly, to FIG. 1 thereof, there is shown, as a part of an internal combustion engine, an actuator which acts on an actuation component designed as a gas exchange valve and which is arranged in a cylinder head 31 of the internal combustion engine. The gas exchange valve 2 is designed either as an exhaust valve or as an intake valve. The gas exchange valve 2 has a shaft 21 and a plate 22. The actuator 1 has a housing 11 in which a first and a second magnet are arranged. The first electromagnet has a first core 12, which is provided with a first solenoid 13. The second electromagnet has a second core 14, which is provided with a second solenoid 15. An armature is provided, the armature plate 16 of which is arranged in the housing 11 such that it can be displaced between a first bearing surface 15a of the first electromagnet and a second bearing surface 15b of the second electromagnet. The armature plate is hence displaceable between a first end position $s_{E1}$ (the closed position) and a second end position $s_{E2}$ (the open position). The armature furthermore comprises an armature shaft 17, which is guided through recesses of the first and the second core 12, 14 and which can be mechanically coupled to the shaft 21 of the gas exchange valve 2. A first restoring device 18a and a second restoring device 18b, which are preferably designed as springs, urge the armature plate 16 into the predetermined resting position $s_0$.

A position sensor is provided, which is arranged on or in the actuator 1 in such a way that it indirectly or directly determines the position s of the armature plate 16 and of the armature shaft 17. The position sensor comprises a sensor element 19a and a transmitter part 19b. Preferably, the transmitter part 19b is arranged on the armature shaft 17 and the sensor element 19a is arranged in the housing 11. The direction of movement of the armature shaft 17 is represented by the double arrow.

A control device 4 is provided, which detects the measurement signal of the position sensor, or alternatively of further sensors, and optionally receives control signals from a master control device for engine operation functions. The control device 4 controls the first and the second solenoid 13, 15 of the actuator 1 in accordance with the measurement signals and the control signals. The control device 4 comprises a control unit 41, in which the actuation signals for the solenoids 13 and 15 are calculated, for which purpose, inter alia, a position regulator is preferably provided, and a first power end stage 42 and a second power end stage 43, which amplifies the actuation signals. The control device 4 may, alternatively, also form a module with the master control device for engine operation functions.

Figure 2:
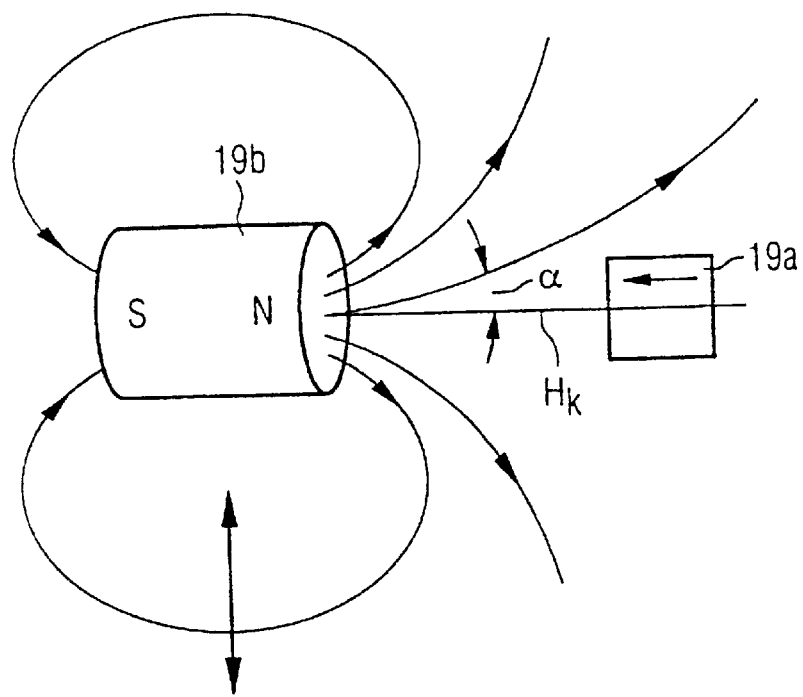
FIG. 2 is an enlarged schematic view of the position sensor.

Referring now to FIG. 2, there is shown the position sensor in an enlarged representation. The transmitter part 19b is a permanent magnet, which is essentially rod-shaped and is arranged with its magnetization direction (i.e. the magnetic axis between the north pole N and the south pole S) perpendicular to the direction of movement of the armature shaft 17 (indicated by the double arrow). The sensor element 19a is a GMR element, and is arranged in such a way that the reference axis b of the magnetization of the measurement layer of the GMR element is parallel to the magnetization direction of the permanent magnet. However, the sensor element 19a may, for example, also be formed as an AMR element or as another element which produces a measurement signal dependent on the direction of the magnetic field.

Ideally, the sensor element 19a and the sensor element 19b are mutually arranged in such a way that the magnetic field component $H_K$ in the resting position $s_0$ encloses an angle α=0 with the reference axis of the sensor element 19a. Each angle α which the magnetic field component $H_K$ encloses between itself and the reference axis b of the sensor element 19a is correlated with a respective position s.

Figure 3:
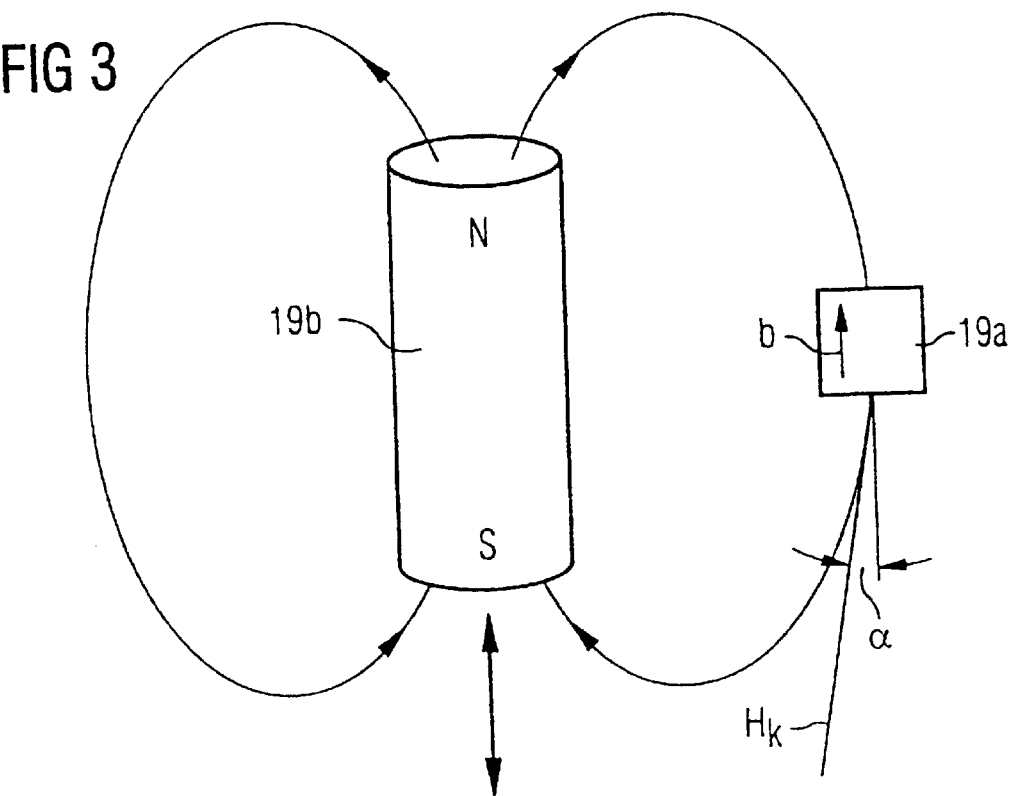
FIG. 3 is a schematic view of a second embodiment of the position sensor.

As an alternative, the transmitter part 19b may also be arranged, as represented in FIG. 3, with its magnetization direction parallel to the direction of movement of the armature shaft 17.

Figure 4:
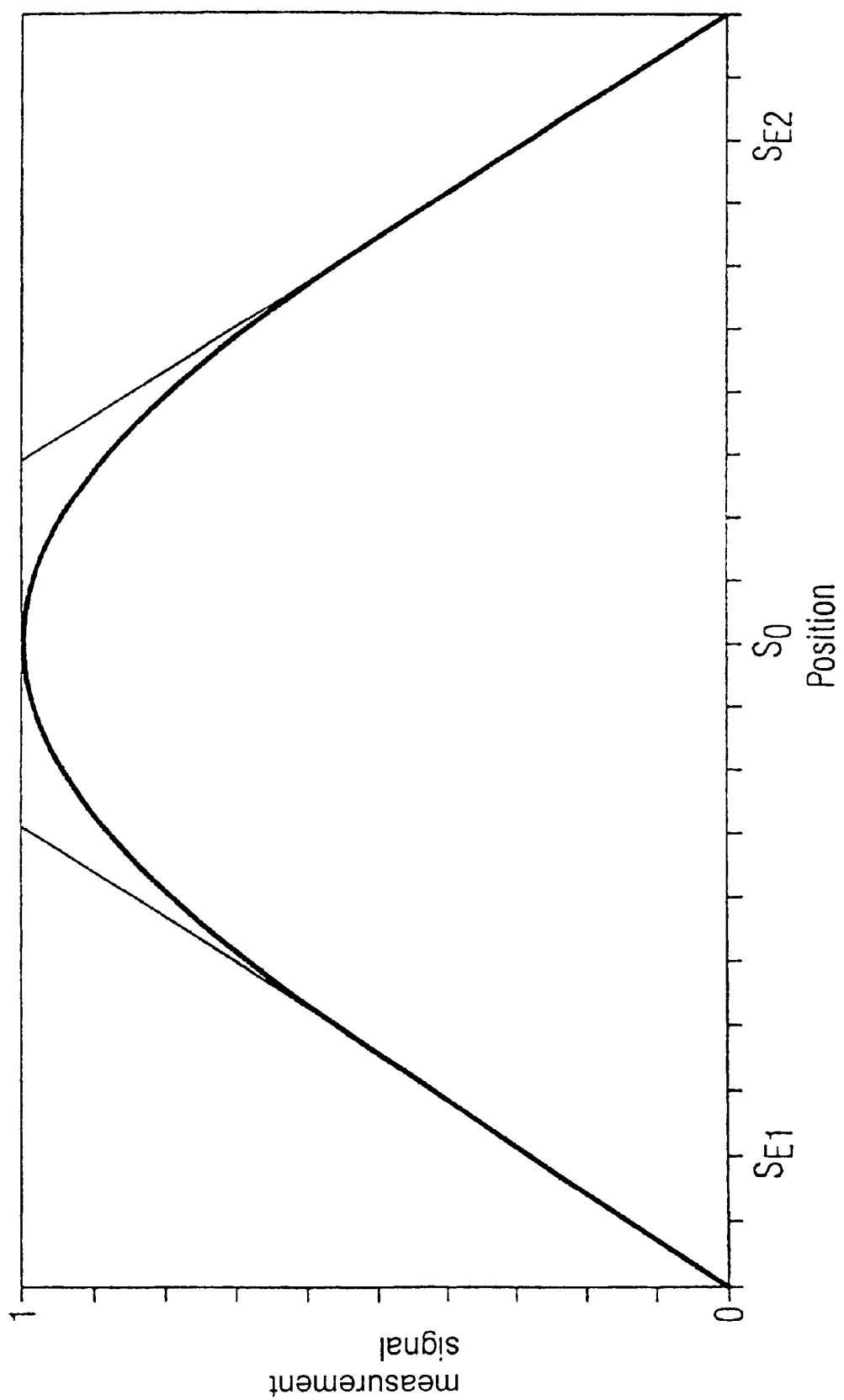
FIG. 4 is a graph showing a profile of the measurement signal of the position sensor in accordance with the position.

The position-dependent profile of the measurement signal of the position sensor according to FIG. 2 or 3 is represented by way of example in FIG. 4. Plotted along the ordinate is the measurement signal normalized to a value range between zero and one. Plotted along the abscissa is the position s of the transmitter part 19b and also, therefore, indirectly the position of the armature shaft 17 and of the armature plate 16. The measurement signal exhibits a bell-shaped cosinusoidal profile which, as can be seen, is approximately linear in the vicinity of the first and second end position $s_{E1}$, $s_{E2}$ whereas it has a pronounced curve in the resting position $s_0$. The cosinusoidal profile is dependent on the relative orientation of two magnetizations in the sensor element 19a, namely the magnetization of the hard magnetic component, which determines the reference axis b, and the magnetization, which follows the external field, of the soft magnetic component, and therefore on the external field. In this case, the field strengths must lie only within a particular field window, preferably approximately in the range from 3 to 30 kA/m. At lower field strengths, the soft magnetic component is not saturated, and at higher field strengths the hard magnetic component is affected.

The profile of the measurement signal is distinguished in that, precisely in the vicinity of the first and second end position $s_{E1}$, $s_{E2}$, the signal runs approximately linearly, which enables a high resolution of the measurement signal and an accurate determination of the position.

Unique allocation of the respective position is, however, only possible at the extreme of the measurement signal, which is a maximum here. Such unique allocation throughout the value range of the measurement signal may, however, be achieved by evaluating information which is available, such as which end position of the gas exchange valve is in fact currently of interest (this may optionally be derived from the control signals of the master control device), or from the electric current through the respective solenoid. The advantage with this type of curve is that, with a view to calibrating the curve, it is possible to ascertain the measurement signals in the first and second end position $s_{E1}$, $s_{E2}$ and also the maximum of the measurement signal. Three points are therefore available at which the characteristic can be determined uniquely, which is advantageous for control of the valve by means of an observer system, since the curve can always be determined.

FIG. 5 represents a first flow chart for the determination of a parameter for the axial offset, which is defined by the offset of the reference axis b of the sensor element 19a with respect to the magnetization axis of the transmitter part 19b in the direction of movement of the transmitter part 19b, specifically when the armature plate 16 is in the resting position so. This axial offset is ideally equal to zero. In the case of series use of the position sensor in the electromechanical actuator 1, however, inaccuracies in the arrangement of the position sensor can occur.

The program (FIG. 5) is started in a step S1. In a step S2, the actual value $U_{E1IST}$ of the measurement signal of the position sensor in the first end position $s_{E1}$, the actual value $U_{E2IST}$ of the measurement signal in the second end position $s_{E2}$ and the actual value $U_{MAXIST}$ of the extreme value of the measurement signal are detected.

In a step S3, an actual ratio IQ is calculated. For this purpose, the difference between the actual value $U_{MAXIST}$ of the extreme value of the measurement signal and the actual value $U_{E1IST}$ of the measurement signal in the first end position $s_{E1}$ is determined, and the difference between the actual value $U_{MAXIST}$ and the actual value $U_{E2IST}$ is determined. The actual ratio then corresponds to the ratio of the two differences. The actual ratio is distinguished in that it is independent of any shift and any change in the gain of the measurement signal, and is a measure of the axial offset.

In a step S4, a setpoint ratio SQ is determined. For this purpose, the difference between the setpoint value $U_{MAXSOLL}$ of the extreme value of the measurement signal and the setpoint value $U_{E1SOLL}$ of the measurement signal in the first position $s_{E1}$, is calculated. Furthermore, the difference between the setpoint value $U_{MAXSOLL}$ of the extreme value of the measurement signal and the setpoint value $U_{E2SOLL}$ of the measurement signal in the second end position $s_{E2}$ is determined. By taking the ratio of the two differences, the setpoint ratio SQ is then calculated. The setpoint values $U_{E1SOLL}$, $U_{E2SOLL}$, $U_{MAXSOLL}$ are set in advance and are determined by measurements on the reference position sensor. Alternatively, the setpoint ratio SQ can also be stored in the control unit 41 as a value set in advance.

In a step S4, a first correction value $\Delta U_{E1}$ and a second correction value $\Delta U_{E2}$ are determined in accordance with the actual ratio IQ and the setpoint ratio SQ. The correction values are preferably determined from a table, in which the first and the second correction value $\Delta U_{E1}$, $\Delta U_{E2}$ and the actual ratio IQ are recorded. As an alternative, the determination may take place by means of a functional relationship between the actual ratio IQ and the first and second correction values $\Delta U_{E1}$, $\Delta U_{E2}$. The table is determined beforehand by trials or measurements.

In a step S5, a corrected setpoint value $U_{E1SOLL'}$ of the measurement signal in the first end position $s_{E1}$ is determined from the sum of the setpoint value $U_{E1SOLL}$ of the measurement signal in the first end position $s_{E1}$ added to the first correction value $\Delta U_{E1}$. In a step S6, a corrected setpoint value $U_{E2SOLL'}$ of the measurement signal in the second end position $s_{E2}$ is determined from the sum of the setpoint value $U_{E2SOLL}$ of the measurement signal in the second end position added to the second correction value $\Delta U_{E2}$. The corrected setpoint values $U_{E1SOLL'}$ and $U_{E2SOLL'}$ are in each case a parameter for the axial offset between the transmitter part 19b and the sensor element 19a. The axial offset can be determined using the corrected setpoint values $U_{E1SOLL'}$ or $U_{E2SOLL'}$ from, respectively, a first or second characteristic which has been determined by measurements on the reference position sensor and is stored in the control unit 41.

Since the axial offset is due to inaccuracies in the installation of the position sensor and in the production of the actuator, it is advantageous for the steps S1 to S7 to be carried out in the starting operation of the actuator. This reduces the computation load on the control unit 41 during the subsequent operation of the position sensor. It may also be advantageous for the steps S1 to S7 to be carried out only after servicing or when setting up the position sensor for first use.

In a step S10 (FIG. 6), a second program is started. The second program allows determining the position s. The corrected setpoint values $U_{E1SOLL'}$, $U_{E2SOLL'}$ determined in the program according to FIG. 4 are read in from a memory. In a step S11, the actual values $U_{E1IST}$, $U_{E2IST}$, $U_{MAIST}$ of the measurement signal in the first and second end positions $s_{E1}$, $s_{E2}$ and the extreme value are determined.

In a step S12, a first gain value $v_1$ and a first offset value $k_1$ are subsequently determined by solving the linear equation system which is indicated in the step S12, in accordance with the setpoint values $U_{E1SOLL'}$, $U_{MAXSOLL}$ and the actual values $U_{E1IST}$, $U_{MAXIST}$.

In a step S13, a second gain value $v_2$ and a second offset value $k_2$ are subsequently determined by solving the linear equation system which is indicated in the step S13, in accordance with the setpoint values $U_{E2SOLL'}$, $U_{MAXSOLL}$ and the actual values $U_{E2IST}$, $U_{MAXIST}$.

In a step S14, the current actual value $U_{IST}$ of the measurement signal of the position sensor is determined. In a step S15, a test is carried out as to whether the position of the armature plate 16 is in the region between the first end position $s_{E1}$ and the resting position $s_0$ or in the region between the resting position $s_0$ and the second end position $s_{E2}$. This may, inter alia, be derived from the history of the measurement signal, from the electric current flowing through the solenoids 13, 15 and from the control instructions of the master control device for engine operation functions.

If the position of the armature plate 16 is in the region between the first end position $s_{E2}$ and the resting position $s_0$, then the program branches to a step S16. Otherwise, the program branches to a step S17.

In the step S16, a corrected actual value $U_{IST}$ of the measurement signal is determined using the linear transformation, which is indicated in the step S16, of the actual value $U_{IST}$ of the measurement signal in accordance with the first gain value $v_1$ and the first offset value $k_1$. In a step S18, the position s is then determined from the difference between two characteristic operations. In the case of the first characteristic operation, a value is determined from the first characteristic KL1 in accordance with the corrected actual value $U_{IST}$ of the measurement signal. In the second characteristic operation, a value is determined from the first characteristic KL1 in accordance with the corrected setpoint value $U_{E1SOLL'}$ of the measurement signal in the first end position $s_{E1}$. Using the second characteristic operation, the axial offset is taken into account. Using the first characteristic operation, the shift and the change in the gain of the measurement signal are taken into account. Overall, with the aid of a permanently stored first characteristic, acquired from the reference position sensor, a highly accurate position signal is thus obtained irrespective of tolerances in the manufacture of the position sensor, inaccuracies in the arrangement of the permanent magnet relative to the magnetoresistive element and the effect of perturbations. In a step S20, the program is then stopped.

In the step S17, a corrected actual value $U_{IST}$ of the measurement signal is determined using the linear transformation, which is indicated in the step S17, of the actual value $U_{IST}$ of the measurement signal in accordance with the second gain value $v_2$ and the first offset value $k_2$. In a step S19, the position s is then determined from the difference between two characteristic operations. In the case of the first characteristic operation, a value is determined from the second characteristic KL2 in accordance with the corrected actual value $U_{IST}$ of the measurement signal. In the second characteristic operation, a value is determined from the second characteristic KL2 in accordance with the corrected setpoint value $U_{E2SOLL}$ of the measurement signal in the second end position $s_{E2}$. Using the second characteristic operation, the axial offset is taken into account; using the first characteristic operation, the shift and the change in the gain of the measurement signal are taken into account. Overall, with the aid of a permanently stored second characteristic, acquired from the reference position sensor, a highly accurate position signal is thus obtained irrespective of tolerances in the manufacture of the position sensor, inaccuracies in the arrangement of the permanent magnet relative to the magnetoresistive element and the effect of perturbations. In a step S20, the program is then stopped.

The steps S11 to S13 are preferably executed only whenever a predetermined period of time has elapsed during the operation of the position sensor (e.g. 1 second) and/or at the start of the operation of the position sensor and only whenever the positions, which are determined in the steps S18 and S19, have been detected as being in error and/or a quantity characterizing the temperature of the position sensor, which is for example the temperature of the position sensor, has changed by a predetermined threshold value. In this way, the computation tasks in the control unit 41 can be kept small without reducing the accuracy of the gain values $v_1$, $v_2$ and the offset values $k_1$, $k_2$, since trials have shown that the perturbations that cause an alteration of the gain value and of the offset value change only slowly.

The steps S14 to S20 are performed either at pre-scheduled times (e.g. every 50 µs) or, in the case of an internal combustion engine, in accordance with the engine speed.

I claim:

1. A method of determining a position in dependence on a measurement signal of a position sensor, the position sensor having a sensor element and a transmitter part displaceable between a first end position and a second end position, and the measurement signal having an extreme value between the first end position and the second end position, which comprises the following method steps:

determining actual values of the measurement signal in a first end position and a second end position;

determining the extreme value of the measurement signal between the first end position and the second end position;

determining a position in dependence on a current actual value of the measurement signal, the extreme value and the actual values in the first end position and the second end position;

determining a parameter for an axial offset between the transmitter part and the sensor element in dependence on the extreme value of the measurement signal and the actual values of the measurement signal in the first end position and in the second end position, and determining the position in dependence on the parameter; and determining a gain value and an offset value in dependence on the parameter for the axial offset, the extreme value of the measurement signal and the actual values in the first end position and in the second end position, and correcting the respective current measurement signal in dependence on the gain value and the offset value.

2. The method according to claim 1, wherein the position sensor is disposed to detect the position of an electromechanical actuator, and wherein the parameter is determined during a starting operation of the actuator.

3. The method according to claim 1, which comprises determining the gain value and the offset value upon the occurrence of an event selected from the group consisting of the following events: a predetermined period of time has elapsed during the operation of the position sensor; a quantity characterizing a temperature of the position sensor has changed by a predetermined threshold value; and an error of the position in the end positions has been detected.

4. The method according to claim 3, which comprises determining the position, in dependence on the corrected current measurement signal, from a characteristic and the parameter for the axial offset.

5. The method according to claim 1, wherein the parameter for the axial offset is a corrected setpoint value of the measurement signal in the first end position or the second end position.

6. The method according to claim 1, which comprises defining the extreme value of the measurement signal as the maximum value.

* * * * *